(12) United States Patent
Aoki

(10) Patent No.: US 10,576,919 B2
(45) Date of Patent: Mar. 3, 2020

(54) VEHICLE POWER SUPPLY CONTROL DEVICE

(71) Applicant: Yazaki Corporation, Tokyo (JP)

(72) Inventor: Yoshihito Aoki, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 268 days.

(21) Appl. No.: 15/889,639

(22) Filed: Feb. 6, 2018

(65) Prior Publication Data
US 2018/0222413 A1    Aug. 9, 2018

(30) Foreign Application Priority Data

Feb. 9, 2017    (JP) ................. 2017-022580

(51) Int. Cl.
| B60R 16/033 | (2006.01) |
| H02J 7/14 | (2006.01) |
| H02J 7/00 | (2006.01) |
| H02J 1/06 | (2006.01) |

(52) U.S. Cl.
CPC ............ B60R 16/033 (2013.01); H02J 1/06 (2013.01); H02J 7/0047 (2013.01); H02J 7/0054 (2013.01); H02J 7/14 (2013.01)

(58) Field of Classification Search
CPC .. B60R 16/033; B60R 16/0238; H02J 7/0047; H02J 1/06; H02J 7/0054; H02J 7/14; H02J 7/0068; H02J 3/005
See application file for complete search history.

(56) References Cited

U.S. PATENT DOCUMENTS

| 2003/0030322 A1* | 2/2003 | Yokoyama ............ B60T 8/3255 303/122.04 |
| 2013/0253722 A1* | 9/2013 | Nakamura .......... B60R 16/0232 700/295 |
| 2014/0159482 A1 | 6/2014 | Satake et al. |

FOREIGN PATENT DOCUMENTS

JP    2013-042563 A    2/2013

* cited by examiner

*Primary Examiner* — Carlos Amaya
*Assistant Examiner* — Thai H Tran
(74) *Attorney, Agent, or Firm* — Sughrue Mion, PLLC

(57) ABSTRACT

A vehicle power supply control device includes a vehicle power supply master connected at one end of a single-system trunk line unit and including a main battery charged with power and discharging power, a plurality of area power supply masters connected with the single-system trunk line unit through branch line units and connected with load units consuming power, a first supply path supplying power from the vehicle power supply master to the area power supply masters through the single-system trunk line unit, a second supply path different from the first supply path, and an external power supplying unit provided outside the area power supply masters and supplying power to the area power supply masters through the second supply path.

10 Claims, 15 Drawing Sheets

VEHICLE POWER SUPPLY CONTROL DEVICE

CROSS-REFERENCE TO RELATED APPLICATION(S)

The present application claims priority to and incorporates by reference the entire contents of Japanese Patent Application No. 2017-022580 filed in Japan on Feb. 9, 2017.

BACKGROUND OF THE INVENTION

1. Field of the Invention

The present invention relates to a vehicle power supply control device.

2. Description of the Related Art

In conventional art, vehicle power supply control devices supply power to load units mounted on vehicles. For example, a vehicle power supply control device includes a battery, and a power supply box connected with the battery and connected with a plurality of load units (for example, refer to Japanese Patent Application Laid-open No. 2013-42563). The vehicle power supply control device supplies power supplied from the battery to the load units through the power supply box.

In some cases, a vehicle is provided with a trunk line unit extending along a traveling direction of the vehicle and having a certain current capacity. In this case, the vehicle power supply control device may supply power of the battery to each of the load units through the power supply box connected with branch line units branched from the trunk line unit, and room for further improvement exists in this respect.

SUMMARY OF THE INVENTION

The present invention has been made in view of above, and an object of the present invention is to provide a vehicle power supply control device capable of stably supplying power to a plurality of load units in the vehicle.

A vehicle power supply control device according to one aspect of the present invention includes a trunk line unit provided on a vehicle; a branch line unit branched from the trunk line unit; a master power supply controller connected with the trunk line unit, and including a main electric storage device charged with power and discharging power; an area power supply controller connected with the trunk line unit through the branch line unit, and connected with load units consuming power; an external power supplying unit provided outside the area power supply controller, and capable of supplying power to the area power supply controller; a first supply path that supplies power to the area power supply controller from the master power supply controller through the trunk line unit and the branch line unit; and a second supply path that is different from the first supply path, and supplies power from the external power supplying unit to the area power supply controller, wherein the area power supply controller supplies power supplied from the master power supply controller through the first supply path, or power supplied from the external power supplying unit through the second supply path, to the load units.

According to another aspect of the present invention, in the vehicle power supply control device, it is preferable that the external power supplying unit includes an external electric storage device different from the main electric storage device and charged with and discharging power, and supplies power to the area power supply controller from the external electric storage device through the second supply path.

According to still another aspect of the present invention, in the vehicle power supply control device, it is preferable that the area power supply controller supplies power of the external electric storage device to the load units through the second supply path, when the master power supply controller is not capable of supplying power to the area power supply controller through the first supply path.

According to still another aspect of the present invention, in the vehicle power supply control device, it is preferable that the area power supply controller supplies power of the external electric storage device to the load units through the second supply path when a charge rate of the external electric storage device is equal to or larger than a preset value, and supplies no power of the external electric storage device to the load units through the second supply path when the charge rate of the external electric storage device is less than the preset value.

According to still another aspect of the present invention, in the vehicle power supply control device, it is preferable that the area power supply controller supplies power of the external electric storage device with priority to the load units through the second supply path, when the master power supply controller is capable of supplying power to the area power supply controller through the first supply path and a charge rate of the external electric storage device is equal to or larger than a preset value.

According to still another aspect of the present invention, in the vehicle power supply control device, it is preferable that the main electric storage device also serves as the external power supplying unit, the trunk line unit includes a plurality of systems of trunk line units, the first supply path is a path supplying power to the area power supply controller from the master power supply controller through one of the trunk line units and the branch line unit, and the second supply path is a path supplying power to the area power supply controller from the master power supply controller through another of the trunk line units and the branch line unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following is a detailed explanation of embodiments (embodiments) to carry out the present invention with reference to the drawings. The present invention is not limited to details described in the following embodiments. The constituent elements described below include those one skilled in the art could easily conceive, and those that are substantially the same. In addition, the structures described below may be properly combined. Various omissions, replacements or changes of the structures may be performed within a range not departing from the gist of the present invention.

First Embodiment

Figure 1:
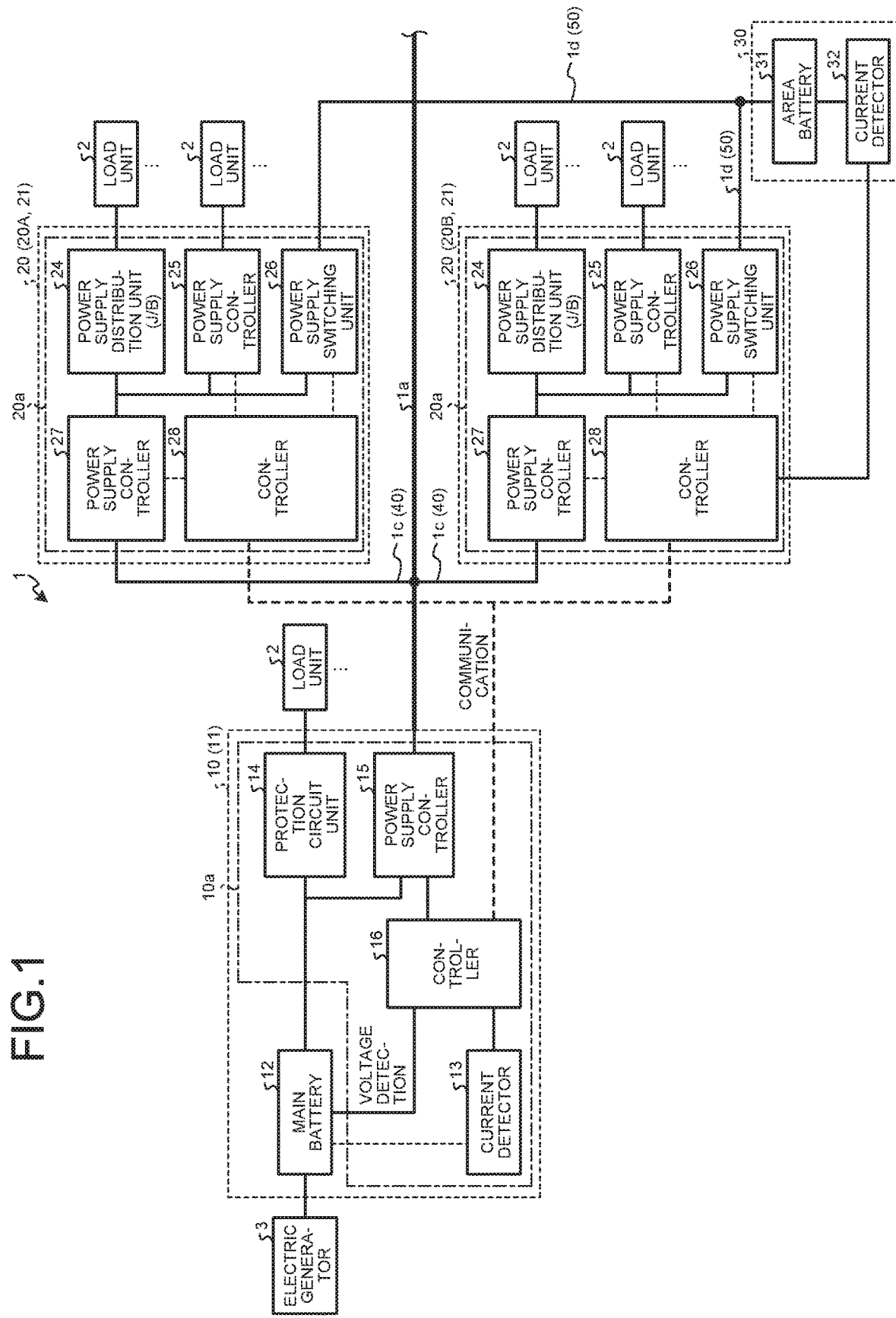
FIG. 1 is a block diagram illustrating a configuration example of a vehicle power supply control device according to a first embodiment.
Figure 2:
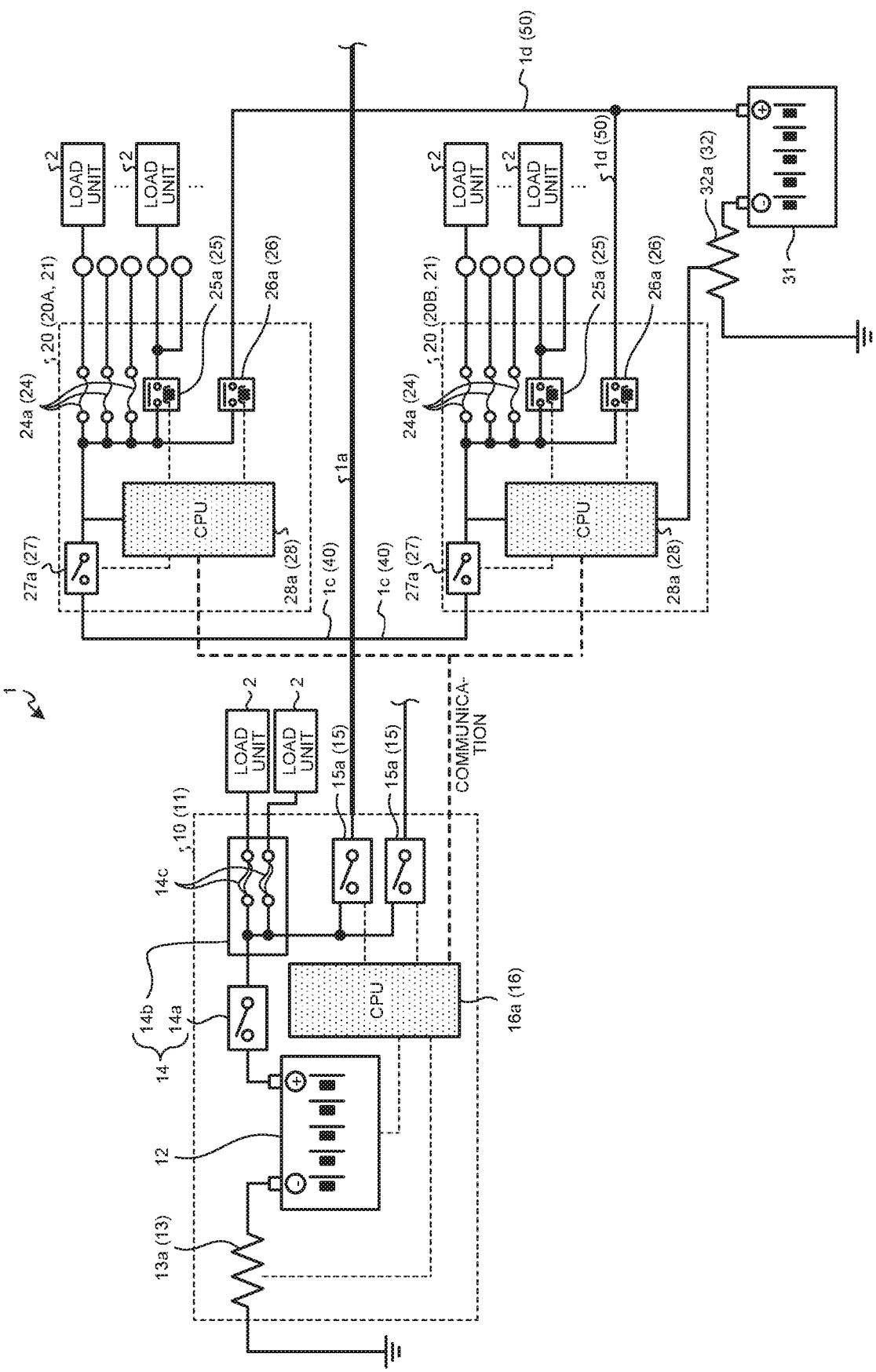
FIG. 2 is a circuit diagram illustrating a configuration example of the vehicle power supply control device according to the first embodiment.

The following is an explanation of a vehicle power supply control device 1 according to the first embodiment. As illustrated in FIG. 1 and FIG. 2, the vehicle power supply control device 1 is installed in a vehicle that is not illustrated, to supply power to a plurality of load units 2 mounted on the vehicle. The following is a detailed explanation of the vehicle power supply control device 1.

The vehicle power supply control device 1 includes a single-system trunk line unit 1a, a plurality of branch line units 1c, a vehicle power supply master 10, a plurality of area power supply masters 20 (20A, 20B), and an external power supplying unit 30. The vehicle power supply control device 1 further includes a first supply path 40 supplying power from the vehicle power supply master 10 to the area power supply masters 20 through the single-system trunk line unit 1a, and a second supply path 50 serving as a supply path different from the first supply path 40 and supplying power from the external power supplying unit 30 to the area power supply masters 20. In the vehicle power supply control device 1, the single-system trunk line unit 1a extends along the traveling direction of the vehicle, and each of the branch line units 1c is branched from the single-system trunk line unit 1a. The single-system trunk line unit 1a may extend along a direction extending along the traveling direction of the vehicle and also extend along a direction orthogonal to the traveling direction of the vehicle, to form a T shape. The single-system trunk line unit 1a is a backbone trunk line unit, and connected at one end with the vehicle power supply master 10. The single-system trunk line unit 1a is connected with the area power supply masters 20 through the respective branch line units 1c.

The single-system trunk line unit 1a includes a trunk line unit power supply line and a trunk line unit communication line that are not illustrated. It suffices that the single-system trunk line unit 1a includes the trunk line unit power supply line in the trunk line unit power supply line, the trunk line unit communication line, and the like, and the trunk line unit communication line and the like are not indispensable constituent elements. The single-system trunk line unit 1a has a structure in which the trunk line unit power supply line, the trunk line unit communication line and the like are arranged to extend side by side along the traveling direction of the vehicle. The trunk line unit power supply line has a certain current capacity, and is formed of a wiring material including a round bar conductor and/or a stranded conductor, and a band-like flat conductor having a flat section. The trunk line unit power supply line causes a current supplied from the vehicle power supply master 10 and the area power supply masters 20 to flow therethrough. The trunk line unit communication line has a certain communication capacity, and is formed of an electric signal transmission cable, an optical signal transmission cable, or the like. The trunk line unit communication line transmits signals transmitted from the vehicle power supply master 10 and the area power supply masters 20.

Each of the branch line units 1c includes a branch line unit power supply line and a branch line unit communication line that are not illustrated. It suffices that each of the branch line units 1c includes the branch line unit power supply line in the branch line unit power supply line, and the branch line unit communication line, and the like, and the branch line unit communication line and the like are not indispensable constituent elements. Each of the branch line units 1c is connected at one end with the single-system trunk line unit 1a, and connected at the other end with the area power supply master 20. The branch line unit power supply line has a current capacity smaller than that of the trunk line unit power supply line, and is formed of a wiring material including a round bar conductor and/or a stranded conductor, and a band-like flat conductor having a flat section. The branch line unit power supply line causes a current supplied from each of the area power supply masters 20 to flow therethrough. The branch line unit communication line has a communication capacity smaller than that of the trunk line unit communication line, and is formed of an electric signal transmission cable or an optical signal transmission cable. The branch line unit communication line transmits signals transmitted from the area power supply master 20.

The vehicle power supply master 10 is a master power supply controller, and supplies power of a main battery 12 described later to each of the load units 2. For example, the vehicle power supply master 10 supplies power of the main battery 12 to each of the load units 2 through each of the area power supply masters 20, or supplies the power of the main battery 12 to each of the load units 2 without through each of the area power supply masters 20. The vehicle power supply master 10 includes a power controller 10a, a housing 11, and the main battery 12. The power controller 10a controls power of the main battery 12, and includes a current detector 13, a protection circuit unit 14, a power supply controller 15, and a controller 16. The vehicle power supply master 10 has a structure in which, for example, the power controller 10a and the main battery 12 are contained in the housing 11. As described above, the vehicle power supply master 10 is installed in, for example, the engine compartment of the vehicle, in a state in which various electronic components of the power controller 10a are contained in the housing 11. In this manner, the vehicle power supply control device 1 enables easy installation of the vehicle power supply master 10. The vehicle power supply master 10 may have a structure in which the main battery 12 is installed outside the housing 11.

The main battery 12 is a main electric storage device, and charged with and discharges power. The main battery 12 includes various storage batteries, such as a lead battery, a nickel hydrogen battery, and a lithium ion battery. The main battery 12 is a battery having a capacity larger than that of an area battery 31 of the external power supplying unit 30 described later. The main battery 12 may have a capacity equivalent to that of the area battery 31, or smaller than that of the area battery 31. The main battery 12 is connected with, for example, an electric generator 3, such as an alternator, and is charged with power generated with the electric generator 3.

The current detector 13 is connected with the main battery 12, and detects the current of the main battery 12. For example, the current detector 13 includes a shunt resistor 13a, to detect the charge/discharge current of the main battery 12. Specifically, the current detector 13 detects current from a voltage proportional to the current generated with resistance of the shunt resistor 13a.

The protection circuit unit 14 is a circuit protecting the load units 2. The protection circuit unit 14 is provided between the main battery 12 and the load units 2 connected with the vehicle power supply master 10, to protect the circuit extending from the main battery 12 to the load units 2. The protection circuit unit 14 includes a shutoff circuit 14a and a protection circuit 14b. The shutoff circuit 14a includes a switch, and is connected with the main battery 12. The shutoff circuit 14a turns on and off the switch, to perform control to turn on and off the current flowing from the main battery 12 to the load units 2. For example, when overcurrent flows from the main battery 12 to the load units 2, the shutoff circuit 14a turns off the switch, to shut off the current. The protection circuit 14b includes a plurality of fuses 14c, and is connected with the shutoff circuit 14a. In the protection circuit 14b, when overcurrent flows from the main battery 12 to the load units 2, each of the fuses 14c is melted to protect the circuit.

The power supply controller 15 controls current flowing from the main battery 12 to the area power supply masters 20 through the single-system trunk line unit 1a and the branch line units 1c. The power supply controller 15 includes a shutoff circuit 15a. The shutoff circuit 15a includes a plurality of switches, and is connected with the area power supply masters 20 through the respective switches and the single-system trunk line unit 1a. The shutoff circuit 15a turns on and off each of the switches, to distribute power to be supplied to the area power supply masters 20 from the main battery 12 through the single-system trunk line unit 1a and the branch line units 1c.

The controller 16 monitors the state of the main battery 12, and controls the power supply controller 15. The controller 16 includes a CPU 16a. The CPU 16a is connected with the shunt resistor 13a, to determine the charge rate (charge quantity) of the main battery 12, on the basis of the current value of the main battery 12 detected with the shunt resistor 13a and the voltage value of the main battery 12. The CPU 16a is also connected with the shutoff circuit 15a of the power supply controller 15, and controls the shutoff circuit 15a. For example, the CPU 16a performs control to turn on and off each of the switches of the shutoff circuit 15a, on the basis of the charge rate of the main battery 12. In this manner, the CPU 16a enables control of the power to be distributed from the main battery 12 to the area power supply masters 20, on the basis of the charge rate of the main battery 12. The CPU 16a is also connected with the area power supply masters 20 through the single-system trunk line unit 1a and the branch line units 1c, and transmits and receives signals to and from the area power supply masters 20.

The following is an explanation of a configuration example of each of the area power supply masters 20. Each of the area power supply masters 20 serves as an area power supply controller, and supplies at least one of the power supplied from the vehicle power supply master 10 and the charged power in the area battery 31 of the external power supplying unit 30 described later to the load units 2. Each of the area power supply masters 20 includes a power controller 20a and a housing 21. The power controller 20a controls power supplied from the vehicle power supply master 10, and the charged power in the area battery 31. The power controller 20a includes a power supply distribution unit (J/B) 24, a power supply controller 25, a power supply switching unit 26, a power supply controller 27, and a controller 28. Each of the area power supply masters 20 has a structure in which, for example, the power controller 20a is contained in the housing 21. The area power supply master 20 is installed inside the front door or the rear door of the vehicle, in a state in which various electronic components of the power controller 20a are contained in the housing 21. In this manner, the vehicle power supply control device 1 enables easy installation of the area power supply master 20. In the first embodiment, a plurality of area power supply masters 20 are installed. Specifically, two area power supply masters 20 among them are installed. The area power supply masters 20 are installed in respective vehicle areas divided according to the assembly structure of the vehicle, but the structure is not limited thereto.

The power supply distribution unit 24 distributes power supplied from the main battery 12 and/or the area battery 31 to the load units 2. For example, the power supply distribution unit 24 includes a plurality of fuses 24a, and is connected with a plurality of load units 2 through the respective fuses 24a. When overcurrent flows through the load units 2, each of the fuses 24a in the power supply distribution unit 24 is melted to protect the circuit.

The power supply controller 25 supplies power supplied from the main battery 12 and/or the area battery 31 to the load units 2. The power supply controller 25 includes, for example, a relay contact 25a, and is connected with a plurality of load units 2 different from the load units 2 connected with the power supply distribution unit 24, through the relay contact 25a. Specifically, each of the area power supply masters 20 is connected with the load units 2 through the power supply distribution unit 24 or the power supply controller 25. The power supply controller 25 turns on the relay contact 25a as a result of excitation of the coil of the relay contact 25a, to supply power to the load units 2. The power supply controller 25 turns off the relay contact 25a as a result of release of excitation of the coil, to stop power supplied to the load units 2.

The power supply switching unit 26 switches supply of the charged power of the area battery 31. The power supply switching unit 26 includes a relay contact 26a, and is connected with the power supply distribution unit 24 and the power supply controller 25 through the relay contact 26a. The power supply switching unit 26 turns on the relay contact 26a as a result of excitation of the coil of the relay contact 26a, to supply power of the area battery 31 to the load units 2 through the power supply distribution unit 24 and the power supply controller 25. The power supply switching unit 26 turns off the relay contact 26a as a result of release of excitation of the coil, to prevent supply of the power of the area battery 31 to the load units 2 through the power supply distribution unit 24 and the power supply controller 25. When the power (output voltage) supplied from the main battery 12 has a power supply characteristic different from the power (output voltage) supplied from the area battery 31, the power supply switching unit 26 equalizes the power supply characteristics.

The power supply controller 27 conducts or shuts off the power supplied from the main battery 12. The power supply controller 27 is connected with the main battery 12 through the single-system trunk line unit 1a and the branch line unit 1c. The power supply controller 27 includes, for example, a shutoff circuit 27a, and turns on and off a switch of the shutoff circuit 27a, to control power supplied to the load units 2 from the main battery 12 to the single-system trunk line unit 1a, the branch line unit 1c, and the like. The power supply controller 27 is connected with the controller 28. The controller 28 performs control to turn on and off the switch of the shutoff circuit 27a.

The controller 28 monitors the state of the area battery 31, and controls the power supply controller 25, the power supply switching unit 26, and the power supply controller 27. The controller 28 includes a CPU 28a. The CPU 28a is connected with a shunt resistor 32a described later, and determines the charge rate of the area battery 31 on the basis of the current value of the area battery 31 detected with the shunt resistor 32a and the voltage value of the area battery 31. The area power supply masters 20 have a structure in which the CPU 28a of the controller 28 of one area power supply master 20B among the area power supply masters 20 is connected with the shunt resistor 32a, to determine the charge rate of the area battery 31.

In addition, the CPU 28a excites the coil of the relay contact 26a of the power supply switching unit 26, to turn on the relay contact 26a, and releases excitation of the coil of the relay contact 26a, to turn off the relay contact 26a. For example, the CPU 28a performs control to turn on and off the relay contact 26a, on the basis of the charge rate of the area battery 31. In this manner, the CPU 28a enables control of the power supplied from the area battery 31 to the load units 2, on the basis of the charge rate of the area battery 31. The CPU 28a of one area power supply master 20B transmits the charge rate of the area battery 31 to the other area power supply master 20A. The CPU 28a performs control to turn on and off the relay contact 25a of the power supply controller 25, to control the power supplied to the load units 2 connected through the power supply controller 25. The CPU 28a also performs control to turn on and off the switch of the shutoff circuit 27a of the power supply controller 27. In this manner, the CPU 28a enables conduction or shutoff of the power supplied from the main battery 12. The CPU 28a is connected with the vehicle power supply master 10 through the single-system trunk line unit 1a and the branch line unit 1c, to transmit and receive signals to and from the vehicle power supply master 10.

The external power supplying unit 30 supplies power to each of the area power supply masters 20. The external power supplying unit 30 is provided outside the area power supply masters 20, and connected with each of the area power supply masters 20 through a connection line 1d. The path connecting the external power supplying unit 30 with each of the area power supply masters 20 through the connection line 1d is the second supply path 50. The external power supplying unit 30 includes the area battery 31 and a current detector 32. The area battery 31 is an external electric storage device, and charged with and discharges power. The area battery 31 is a battery different from the main battery 12, and connected with each of the area power supply masters 20. The area battery 31 includes various storage batteries, such as a lead battery, a nickel hydrogen battery, and a lithium ion battery. The external power supplying unit 30 supplies power to each of the area power supply masters 20 from the area battery 31 through the second supply path 50. The current detector 32 is connected with the area battery 31, to detect the current of the area battery 31. The current detector 32 includes, for example, the shunt resistor 32a, to detect the charge/discharge current of the area battery 31. Specifically, the current detector 32 detects the current from the voltage proportional to the current generated with the resistance of the shunt resistor 32a. The current detector 32 is connected with the area power supply master 20B, and outputs a detection result to the area power supply master 20B.

Figure 3:
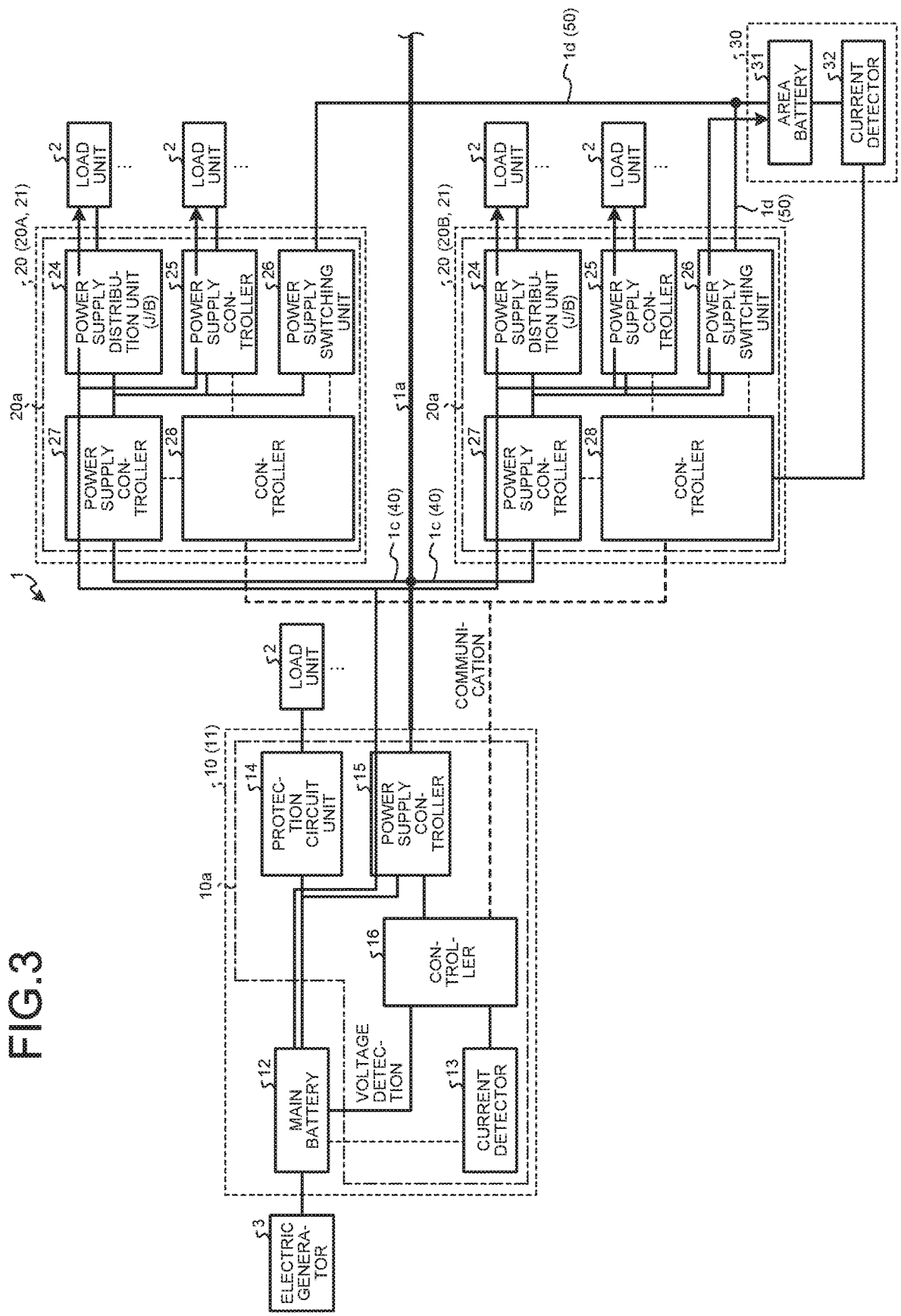
FIG. 3 is a block diagram illustrating a first operation example of the vehicle power supply control device according to the first embodiment.
Figure 4:
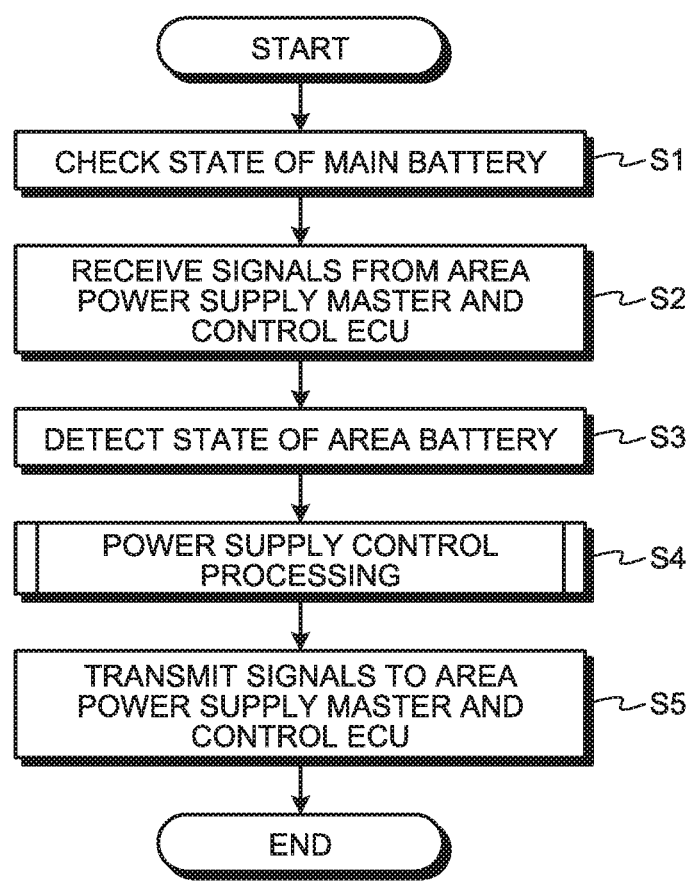
FIG. 4 is a flowchart illustrating the first operation example of the vehicle power supply control device according to the first embodiment.

First Operation Example of First Embodiment: Processing of Charging Area Battery The following is a first operation example of the vehicle power supply control device 1 according to the first embodiment. This example illustrates an example in which the power of the main battery 12 is supplied to the load units 2 and charges the area battery 31 of the external power supplying unit 30, as illustrated in FIG. 3. As illustrated in FIG. 4, the vehicle power supply master 10 checks the state of the main battery 12 (Step S1). For example, the vehicle power supply master 10 checks the voltage value of the main battery 12. Thereafter, the vehicle power supply master 10 receives signals relating to power from the area power supply master 20B and the control ECU (not illustrated) through the single-system trunk line unit 1a and the branch line unit 1c (Step S2). The control ECU controls the whole vehicle, for example, controls a driving system, such as the engine, and a braking system, such as the brake. Thereafter, the vehicle power supply master 10 detects the state of the area battery 31 of the external power supplying unit 30 from the area power supply master 20B (Step S3). For example, the vehicle power supply master 10 detects the charge rate of the area battery 31 from the area power supply master 20B. Thereafter, the vehicle power supply master 10 performs power supply control processing (Step S4). For example, the vehicle power supply master 10 supplies the power of the main battery 12 to the area power supply master 20B, to charge the area battery 31, on the basis of the power generation capacity of the electric generator 3. The details of the power supply control processing will be described later. Thereafter, the vehicle power supply master 10 transmits signals to the area power supply master 20B and the control ECU through the single-system trunk line unit 1a and the branch line unit 1c (Step S5), and ends the processing. For example, the vehicle power supply master 10 transmits information relating to charge at Step S4 described above to the area power supply master 20B and the control ECU through the single-system trunk line unit 1a and the branch line unit 1c.

Figure 5:
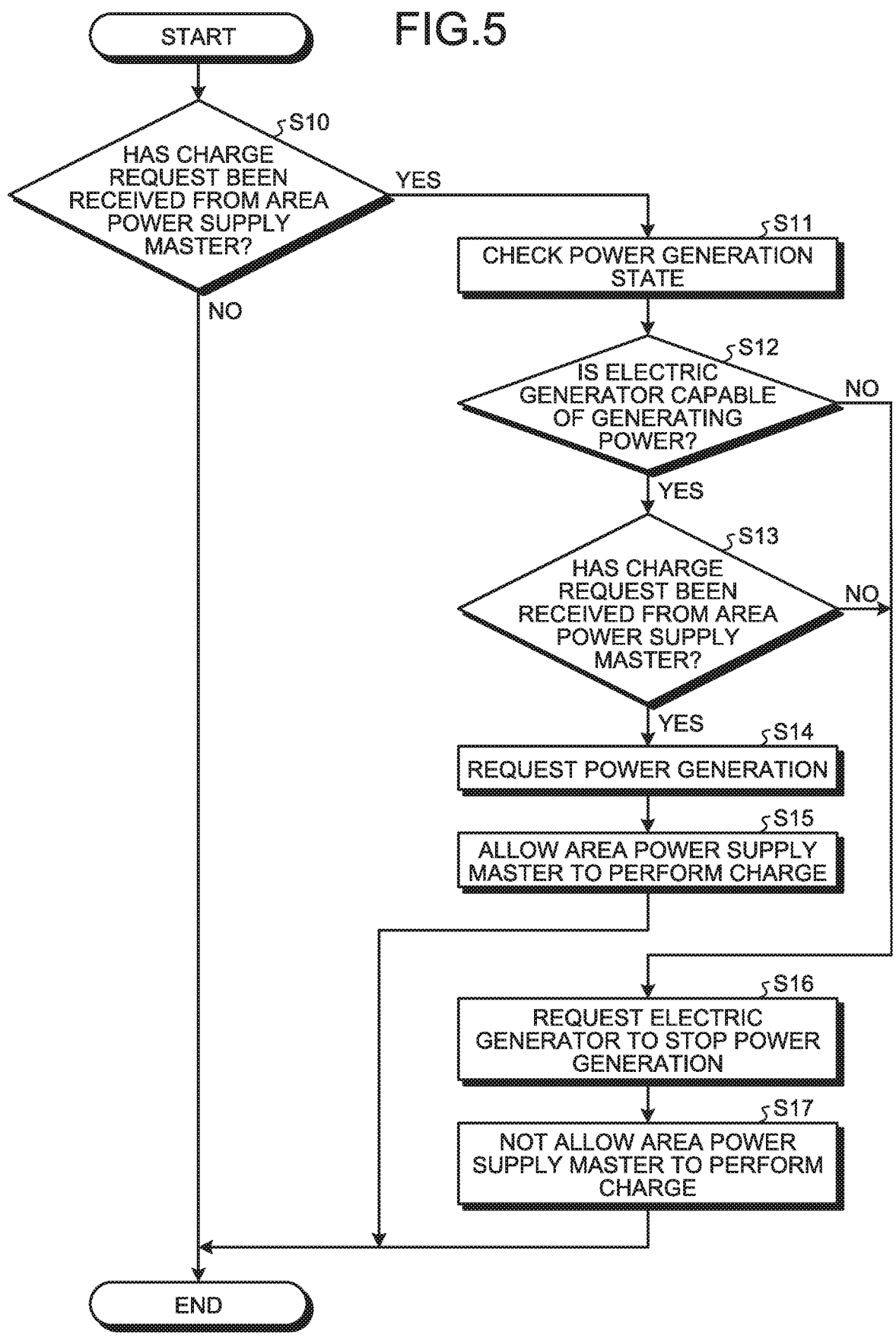
FIG. 5 is a flowchart illustrating the first operation example of the vehicle power supply control device according to the first embodiment.

The following is a detailed explanation of the power supply control processing at Step S4 described above. As illustrated in FIG. 5, the vehicle power supply master 10 determines whether a request to charge the area battery 31 of the external power supplying unit 30 has been received from the area power supply master 20B (Step S10). When a charge request from the area power supply master 20B exists (Yes at Step S10), the vehicle power supply master 10 checks the power generation state of the electric generator 3 (Step S11). Thereafter, the vehicle power supply master 10 determines whether the electric generator 3 is capable of generating the power to charge the area battery 31 of the external power supplying unit 30 (Step S12). When the electric generator 3 is capable of generating the power to charge the area battery 31 (Yes at Step S12), the vehicle power supply master 10 determines whether a charge request has been received from the area power supply master 20B (Step S13). When a charge request has been received from the area power supply master 20B (Yes at Step S13), the vehicle power supply master 10 requests the electric generator 3 to generate power to charge the area battery 31 (Step S14). Thereafter, as illustrated in FIG. 5, the vehicle power supply master 10 allows the area power supply master 20B to perform charge, and supplies the power generated with the electric generator 3 and supplied to the main battery 12 to the area battery 31 of the external power supplying unit 30 through the single-system trunk line unit 1a and the area power supply master 20B (Step S15). Thereafter, the vehicle power supply master 10 charges the area battery 31 of the external power supplying unit 30 through the area power supply master 20B, and supplies power to the load units 2 through the area power supply master 20B and the other area power supply master 20A, to end the processing. When the vehicle power supply master 10 charges the area battery 31 of the external power supplying unit 30 through the area power supply master 20B, the vehicle power supply master 10 may only charge the area battery 31 of the external power supplying unit 30, without supplying power to the load units 2 through the area power supply master 20B.

At Step S12 described above, when the electric generator 3 is not capable of generating the power to charge the area battery 31 (No at Step S12), the vehicle power supply master 10 requests the electric generator 3 to stop generation of power to charge the area power supply master 20B (Step S16). Thereafter, the vehicle power supply master 10 does not allow the area power supply master 20B to perform charge (Step S17), and ends the processing. At Step S10 described above, when no charge request has been received from the area power supply master 20B (No at Step S10), the vehicle power supply master 10 ends the processing without supply the power generated with the electric generator 3 to the area power supply master 20B.

As described above, the vehicle power supply control device 1 according to the embodiment serving as the first operation example has a structure in which the vehicle power supply master 10 charges the area battery 31 of the external power supplying unit 30 through the single-system trunk line unit 1a and the branch line unit 1c, when a charge request is received from the area power supply master 20B.

Figure 6:
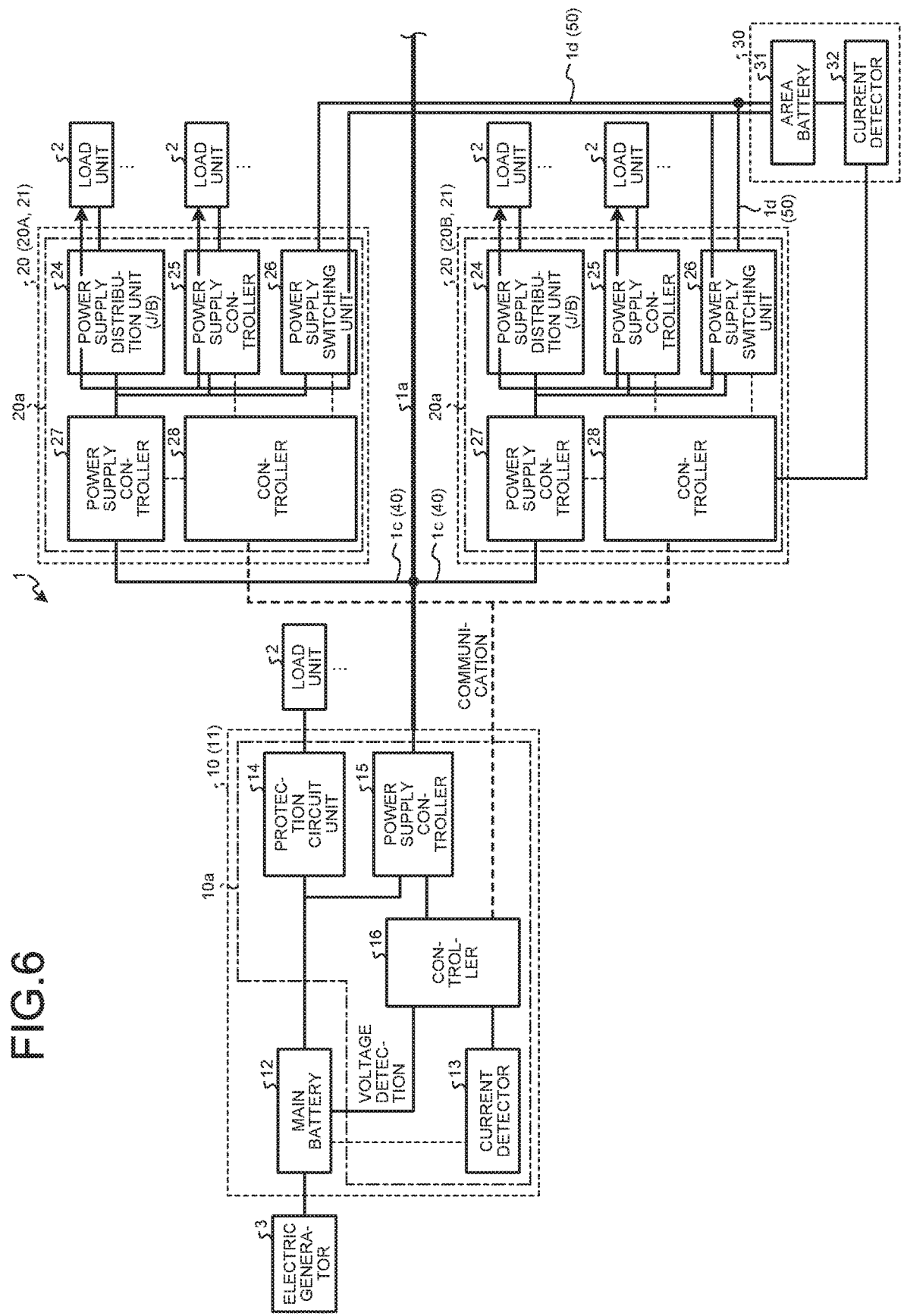
FIG. 6 is a block diagram illustrating a second operation example of the vehicle power supply control device according to the first embodiment.
Figure 7:
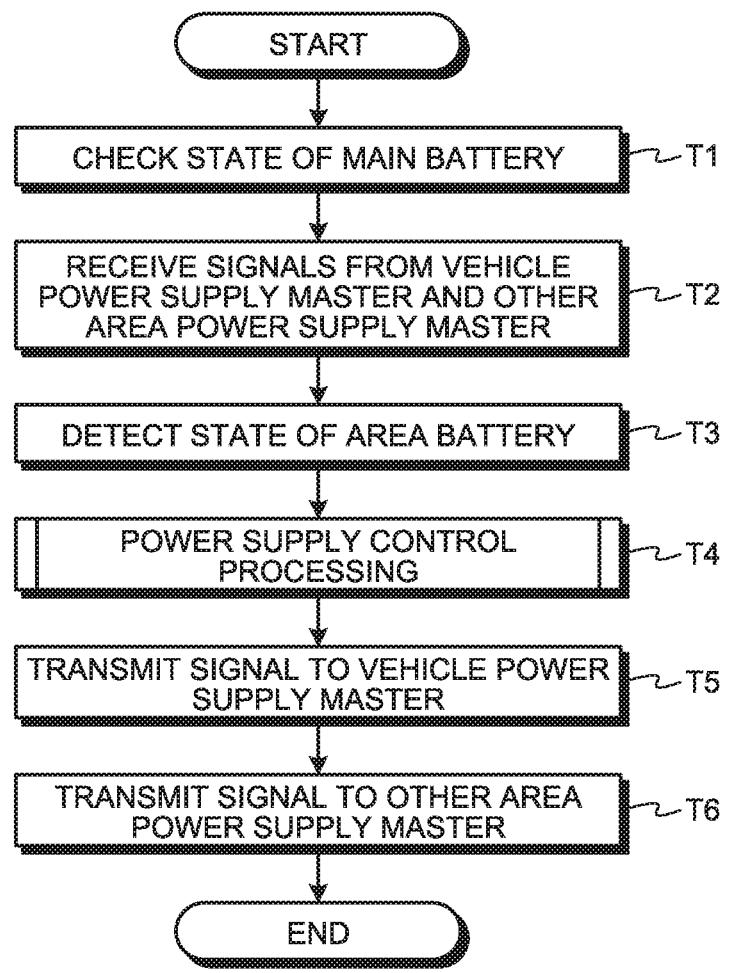
FIG. 7 is a flowchart illustrating the second operation example of the vehicle power supply control device according to the first embodiment.

Second Operation Example of First Embodiment: Processing Performed when Power Supply from Main Battery Is Impossible The following is an explanation of a second operation example of the vehicle power supply control device 1 according to the embodiment. This example illustrates the case where the vehicle power supply control device 1 is not capable of supplying the power of the main battery 12 to the load units 2 of the area power supply masters 20, due to deterioration of the main battery 12, malfunction of the single-system trunk line unit 1a or the branch line units 1c, or abnormality of the power supply controller 27, or the like, as illustrated in FIG. 6. As illustrated in FIG. 7, the area power supply master 20B checks the state (for example, the voltage value) of the main battery 12 from the vehicle power supply master 10 (Step T1). Thereafter, the area power supply master 20B receives information relating to the power from the vehicle power supply master 10 through the single-system trunk line unit 1a and the branch line unit 1c (Step T2). Thereafter, the area power supply master 20B detects the state (for example, the charge rate) of the area battery 31 of the external power supplying unit 30 (Step T3). Thereafter, the area power supply master 20B performs power supply control processing (Step T4). For example, the area power supply master 20B supplies the power of the main battery 12 supplied from the vehicle power supply master 10 through the single-system trunk line unit 1a and the branch line unit 1c, or the power of the area battery 31 to the load units 2, on the basis of the states of the main battery 12 and the area battery 31 of the external power supplying unit 30. The details of the power supply control processing will be described later. Thereafter, the area power supply master 20B transmits a signal to the vehicle power supply master 10 through the single-system trunk line unit 1a and the branch line unit 1c (Step T5). For example, the area power supply master 20B transmits information relating to the power supplied at Step T4 described above to the vehicle power supply master 10 through the single-system trunk line unit 1a and the branch line unit 1c. Specifically, the area power supply master 20B transmits information that the power of the main battery 12 is supplied to the load units 2, or information that the power of the area battery 31 is supplied to the load units 2 to the vehicle power supply master 10. Thereafter, the area power supply master 20B transmits a signal to the other area power supply master 20A through the single-system trunk line unit 1a and the branch line unit 1c (Step T6), and ends the processing. For example, the area power supply master 20B transmits information relating to the power supplied at Step T4 described above to the other area power supply master 20A through the single-system trunk line unit 1a and the branch line unit 1c. As described above, as the power supply control processing, the area power supply master 20B supplies the power of the main battery 12 supplied from the vehicle power supply master 10, or the power of the area battery 31, to the load units 2, on the basis of the states of the main battery 12 and the area battery 31 of the external power supplying unit 30.

Figure 8:
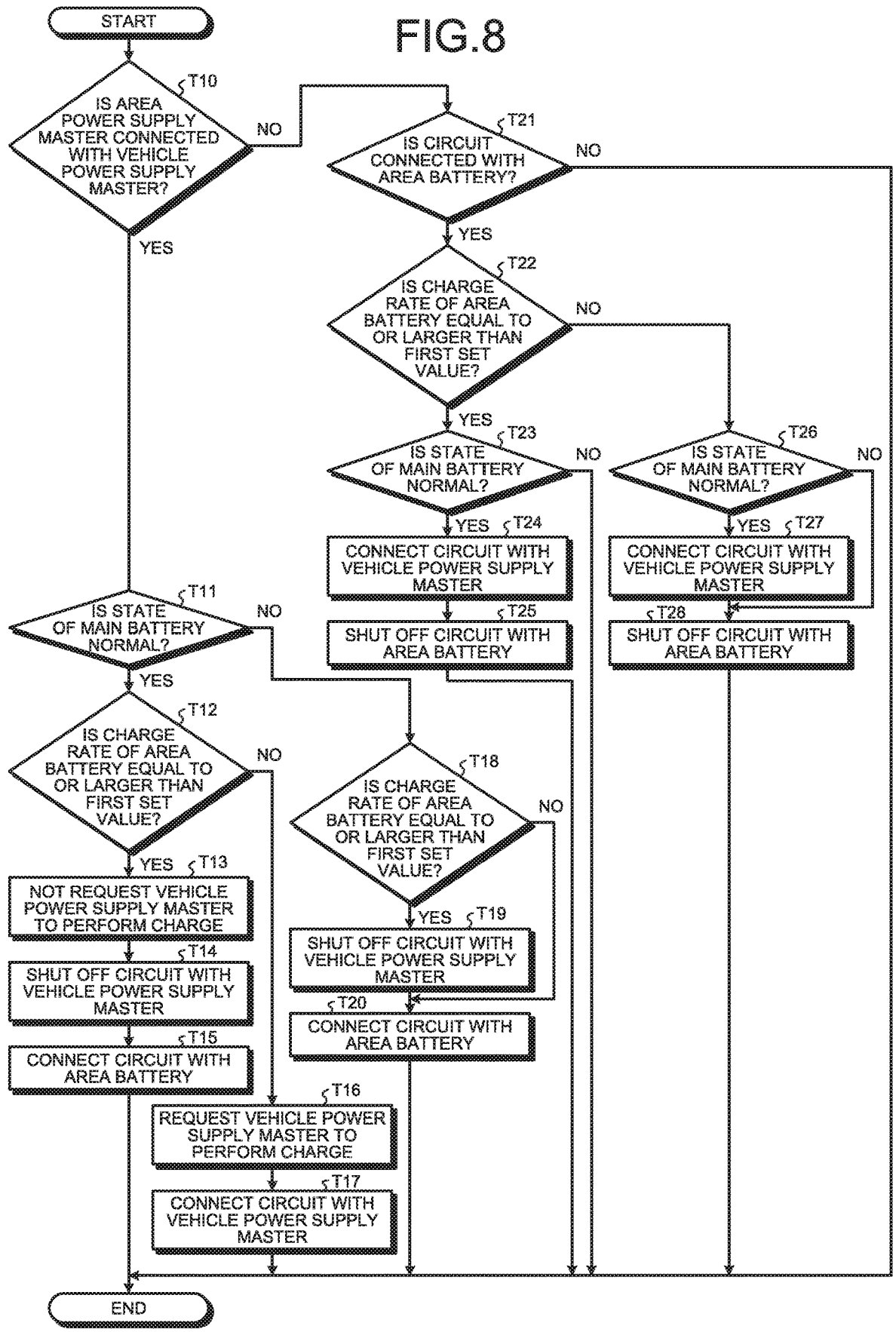
FIG. 8 is a flowchart illustrating the second operation example of the vehicle power supply control device according to the first embodiment.

The following is a detailed explanation of the power supply control processing at Step T4 described above. As illustrated in FIG. 8, the area power supply master 20B determines whether it is connected with the vehicle power supply master 10 (Step T10). When it is connected with the vehicle power supply master 10 (Yes at Step T10), the area power supply master 20B determines whether the state of the main battery 12 is normal (Step T11). For example, the area power supply master 20B determines that the state of the main battery 12 is normal when the charge rate of the main battery 12 is equal to or larger than a preset value, and determines that the state of the main battery 12 is abnormal when the charge rate of the main battery 12 is less than the preset value. When the state of the main battery 12 is normal (Yes at Step T11), the area power supply master 20B determines whether the charge rate of the area battery 31 of the external power supplying unit 30 is equal to or larger than a predetermined first set value (Step T12). When the charge rate of the area battery 31 is equal to or larger than the first set value (Yes at Step T12), each of the area power supply masters 20A and 20B does not request the vehicle power supply master 10 to perform charge (Step T13), but shuts off the circuit with the vehicle power supply master 10 (Step T14). For example, each of the area power supply masters 20 turns off the switch of the shutoff circuit 27a of the power supply controller 27. Thereafter, each of the area power supply masters 20 connects a circuit with the area battery 31 (Step T15). For example, each of the area power supply masters 20 turns on the relay contact 26a of the power supply switching unit 26. As described above, when the charge rate of each area battery 31 is equal to or larger than the first set value, each of the area power supply masters 20 supplies the power of the area battery 31 to the load units 2, and ends the processing.

By contrast, when the charge rate of the area battery 31 of the external power supplying unit 30 is less than the first set value (No at Step T12), the area power supply master 20B requests the vehicle power supply master 10 to perform charge (Step T16). For example, the area power supply master 20B outputs a signal indicating a charge request to the vehicle power supply master 10 through the single-system trunk line unit 1a and the branch line unit 1c. Thereafter, the area power supply master 20B connects the circuit with the vehicle power supply master 10 (Step T17), and ends the processing. For example, the area power supply master 20B turns on the switch of the shutoff circuit 27a of the power supply controller 27. In this manner, the area power supply master 20B enables charge of the area battery 31 with the power supplied from the main battery 12 through the single-system trunk line unit 1a and the branch line unit 1c, and supply of the power to the load units 2.

At Step T11 described above, when the state of the main battery 12 is abnormal (No at Step T11), the area power supply master 20B determines whether the charge rate of the area battery 31 of the external power supplying unit 30 is equal to or larger than the first set value (Step T18). When the charge rate of the area battery 31 is equal to or larger than the first set value (Yes at Step T18), each of the area power supply masters 20 shuts off the circuit with the vehicle power supply master 10 (Step T19). For example, each of the area power supply masters 20 turns off the switch of the shutoff circuit 27a of the power supply controller 27. Thereafter, each of the area power supply masters 20 connects the circuit with the area battery 31 (Step T20), and ends the processing. For example, each of the area power supply masters 20 turns on the relay contact 26a of the power supply switching unit 26. In this manner, each of the area power supply masters 20 enables supply of the power of the area battery 31 to the load units 2. As described above, when the vehicle power supply master 10 is not capable of supplying power to each of the area power supply masters 20, each of the area power supply masters 20 supplies the power of the area battery 31 to the load units 2. At Step T18 described above, when the charge rate of each area battery 31 is less than the first set value (No at Step T18), each of the area power supply masters 20 connects the circuit with the area battery 31, without shutting off the circuit with the vehicle power supply master 10 (Step T20).

In addition, at Step T10 described above, when it is not connected with the vehicle power supply master 10 (No at Step T10), each of the area power supply masters 20 determines whether the circuit is connected with the area battery 31 (Step T21). When the circuit is connected with the area battery 31 (Yes at Step T21), the area power supply master 20B determines whether the charge rate of the area battery 31 is equal to or larger than the first set value (Step T22). When the charge rate of the area battery 31 is equal to or larger than the first set value (Yes at Step T22), the area power supply master 20B determines whether the state of the main battery 12 is normal (Step T23). When the state of the main battery 12 is normal (Yes at Step T23), each of the area power supply masters 20 connects the circuit with the vehicle power supply master 10 (Step T24), shuts off the circuit with the area battery 31 (Step T25), and ends the processing. In this manner, each of the area power supply masters 20 enables supply of the power supplied from the main battery 12 through the single-system trunk line unit 1a and the branch line unit 1c to the load units 2. When the state of the main battery 12 is abnormal (No at Step T23), each of the area power supply masters 20 does not connect the circuit with the vehicle power supply master 10, but continues connection with the area battery 31.

In addition, at Step T22 described above, when the charge rate of the area battery 31 is less than the first set value (No at Step T22), the area power supply master 20B determines whether the state of the main battery 12 is normal (Step T26). When the state of the main battery 12 is normal (Yes at Step T26), each of the area power supply masters 20 connects the circuit with the vehicle power supply master 10 (Step T27), shuts off the circuit with the area battery 31 (Step T28), and ends the processing. In this manner, each of the area power supply masters 20 enables charge of the area battery 31 with the power supplied from the main battery 12 through the single-system trunk line unit 1a and the branch line unit 1c, and supply of the power to the load units 2. When the state of the main battery 12 is abnormal (No at Step T26), each of the area power supply masters 20 does not connect the circuit with the vehicle power supply master 10, but shuts off the circuit with the area battery 31 (Step T28), and ends the processing.

As described above, the vehicle power supply control device 1 according the first embodiment serving as the second operation example includes the single-system trunk line unit 1a provided on the vehicle, branch line units 1c branched from the single-system trunk line unit 1a, the vehicle power supply master 10 connected with one end of the single-system trunk line unit 1a and including the main battery 12 charged with and discharging power, a plurality of area power supply masters 20 connected with the single-system trunk line unit 1a through the respective branch line units 1c and connected with the load units 2 consuming power, the first supply path 40 to supply power from the vehicle power supply master 10 to the area power supply masters 20 through the single-system trunk line unit 1a and the branch line unit 1c, the second supply path 50 serving as a supply path different from the first supply path 40 and supplying power to the area power supply masters 20, and the external power supplying unit 30 provided outside the area power supply masters 20 and supplying power to the area power supply masters 20 through the second supply path 50. In addition, each of the area power supply masters 20 supplies power supplied from the vehicle power supply master 10 through the first supply path 40, or power supplied from the external power supplying unit 30 through the second supply path 50, to the load units 2. This structure enables the vehicle power supply control device 1 to supply power from the vehicle power supply master 10 to the load units 2, when power is supplied from the vehicle power supply master 10 through the first supply path 40. In addition, when no power is supplied from the vehicle power supply master 10 through the first supply path 40, the vehicle power supply control device 1 is enabled to supply power from the external power supplying unit 30 to the load units 2 through the second supply path 50. Accordingly, the vehicle power supply control device 1 is enabled to stably supply power to the load units 2 of the vehicle. In addition, the vehicle power supply control device 1 improves wiring property with the single-system trunk line unit 1a and the branch line unit 1c.

In addition, in the vehicle power supply control device 1, the external power supplying unit 30 includes the area battery 31 different from the main battery 12 and charged with and discharging power, and supplies power from the area battery 31 to each of the area power supply masters 20 through the second supply path 50. This structure enables the vehicle power supply control device 1 to supply power to the load units 2 from the area battery 31 of the external power supplying unit 30 through the area power supply masters 20, and stably supply power to the load units 2.

In the vehicle power supply control device 1, each of the area power supply masters 20 supplies power of the area battery 31 to the load units 2, when the vehicle power supply master 10 is not capable of supplying power to each of the area power supply masters 20 through the first supply path 40. This structure enables the vehicle power supply control device 1 to stably supply power to the load units 2, when the vehicle power supply master 10 is not capable of supplying power to each of the area power supply masters 20.

In the vehicle power supply control device 1, each of the area power supply masters 20 supplies power of the area battery 31 to the load units 2 when the charge rate of the area battery 31 is equal to or larger than the predetermined first set value, and does not supply power of the area battery 31 to the load units 2 when the charge rate of the area battery 31 is less than the first set value. This structure enables the vehicle power supply control device 1 to supply the power of the area battery 31 to the load units 2, in accordance with the charge rate of the area battery 31.

In the vehicle power supply control device 1, each of the area power supply masters 20 supplies power of the area battery 31 with priority to the load units 2 through the second supply path 50, when the vehicle power supply master 10 is capable of supplying power to the area power supply master 20 through the first supply path 40 and the charge rate of the area battery 31 is equal to or larger than the predetermined first set value. This structure enables the vehicle power supply control device 1 to suppress concentrated use of the main battery 12 of the vehicle power supply master 10. In addition, the vehicle power supply control device 1 enables effective use of the area battery 31.

Second Embodiment

Figure 9:
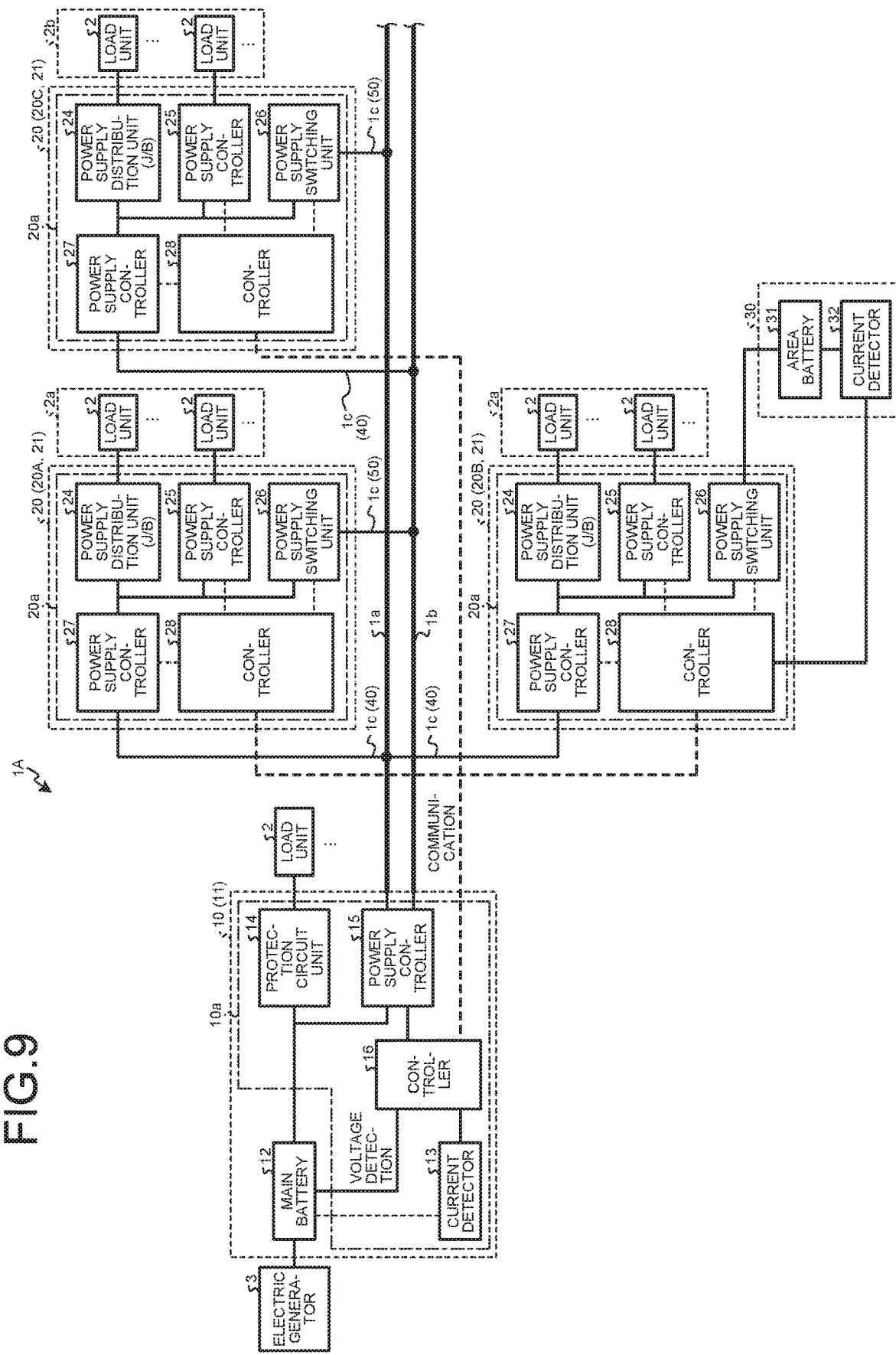
FIG. 9 is a block diagram illustrating a configuration example of the vehicle power supply control device according to a second embodiment.
Figure 10:
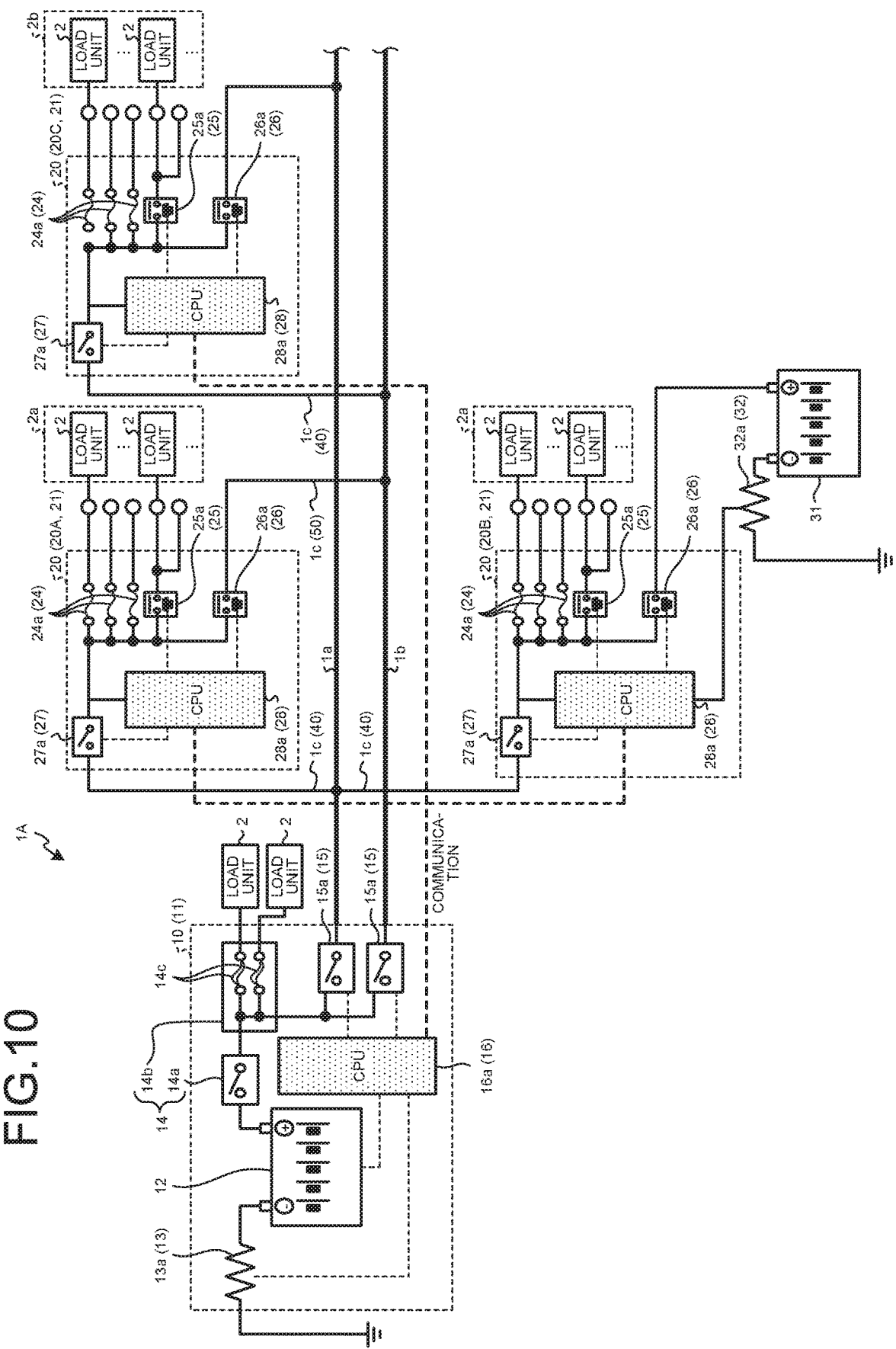
FIG. 10 is a circuit diagram illustrating the configuration example of the vehicle power supply control device according to the second embodiment.

The following is an explanation of a vehicle power supply control device 1A according to the second embodiment. As illustrated in FIG. 9 and FIG. 10, the vehicle power supply control device 1A is different from the first embodiment, in that the vehicle power supply control device 1A includes two-system trunk line units 1a and 1b, and has a structure in which the power of the main battery 12 of the vehicle power supply master 10 is supplied to the load units 2 from the two-system trunk line units 1a and 1b serving as the external power supplying unit 30. The following is a detailed explanation of the vehicle power supply control device 1A. In the vehicle power supply control device 1A, constituent elements equivalent to those of the vehicle power supply control device 1 according to the first embodiment are denoted with the same reference numerals, and a detailed explanation thereof is omitted.

The vehicle power supply control device 1A includes a plurality of systems (for example, two systems) of trunk line units 1a and 1b, a plurality of branch line units 1c, the vehicle power supply master 10, and a plurality of area power supply masters 20. The vehicle power supply control device 1A also includes the first supply path 40 supplying power from the vehicle power supply master 10 to the area power supply masters 20 through the first trunk line unit 1a and the branch line units 1c, and the second supply path 50 serving as a path different from the first supply path 40 and supplying power from the vehicle power supply master 10 to the area power supply masters 20 through the second trunk line unit 1b and the branch line units 1c. The vehicle power supply control device 1A has a structure in which the two-system trunk line units 1a and 1b extend along the traveling direction of the vehicle, and the branch line units 1c are branched from the two-system trunk line units 1a and 1b. Each of the two-system trunk line units 1a and 1b may extend along a direction extending along the traveling direction of the vehicle and also extend along a direction orthogonal to the traveling direction of the vehicle, to form a T shape. Each of the two-system trunk line units 1a and 1b is a backbone trunk line unit, and connected at one end with the vehicle power supply master 10. Each of the two-system trunk line units 1a and 1b is connected with the area power supply masters 20 through the respective branch line units 1c.

Each of the two-system trunk line units 1a and 1b includes a trunk line unit power supply line and a trunk line unit communication line that are not illustrated. It suffices that each of the two-system trunk line units 1a and 1b includes the trunk line unit power supply line in the trunk line unit power supply line, the trunk line unit communication line, and the like, and the trunk line unit communication line and the like are not indispensable constituent elements. Each of the two-system trunk line units 1a and 1b has a structure in which the trunk line unit power supply line, the trunk line unit communication line, and the like are arranged to extend side by side along the traveling direction of the vehicle.

The two-system trunk line units 1a and 1b are used separately, for example, according to the type of the load units 2. The load units 2 are distributed into different load groups, for example, according to the type of the load units 2. For example, the load units 2 are distributed into a first load group 2a relating to traveling of the vehicle and having relatively high importance, and a second load group 2b relating to elements other than traveling of the vehicle and having relatively low importance. The first trunk line unit 1a in the two-system trunk line units 1a and 1b is connected with, for example, the first load group 2a relating to traveling of the vehicle through the area power supply masters 20. The second trunk line unit 1b is connected with the second load group 2b relating to elements other than traveling of the vehicle through the area power supply masters 20. The trunk line units 1a and 1b may be two systems or more. The trunk line units 1a and 1b may be used separately for the respective areas of the vehicle. The trunk line units 1a and 1b may be arranged with different paths, to protect the trunk line units 1a and 1b and/or secure the wiring space.

Figure 11:
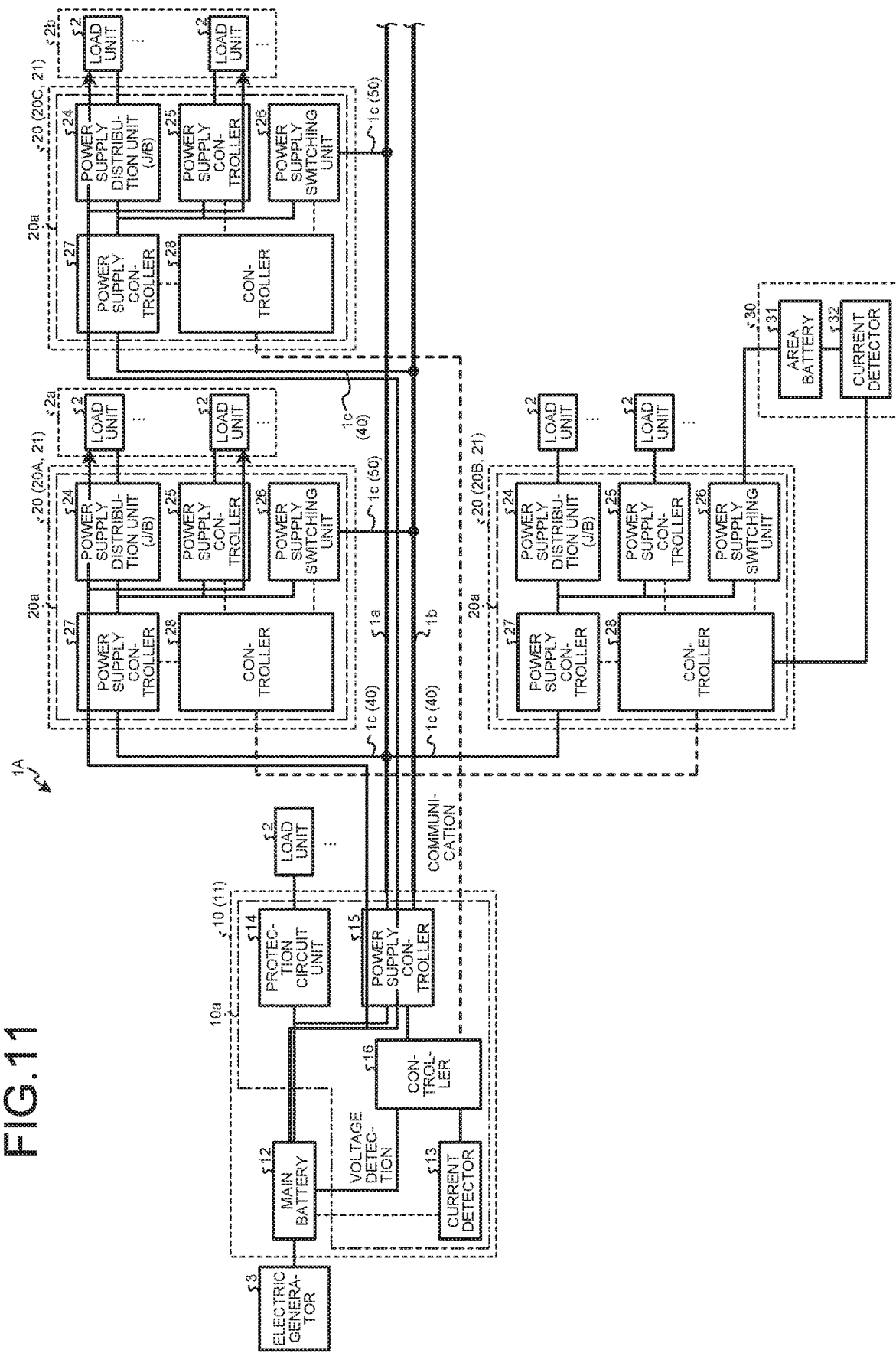
FIG. 11 is a block diagram illustrating a first operation example of the vehicle power supply control device according to the second embodiment.
Figure 12:
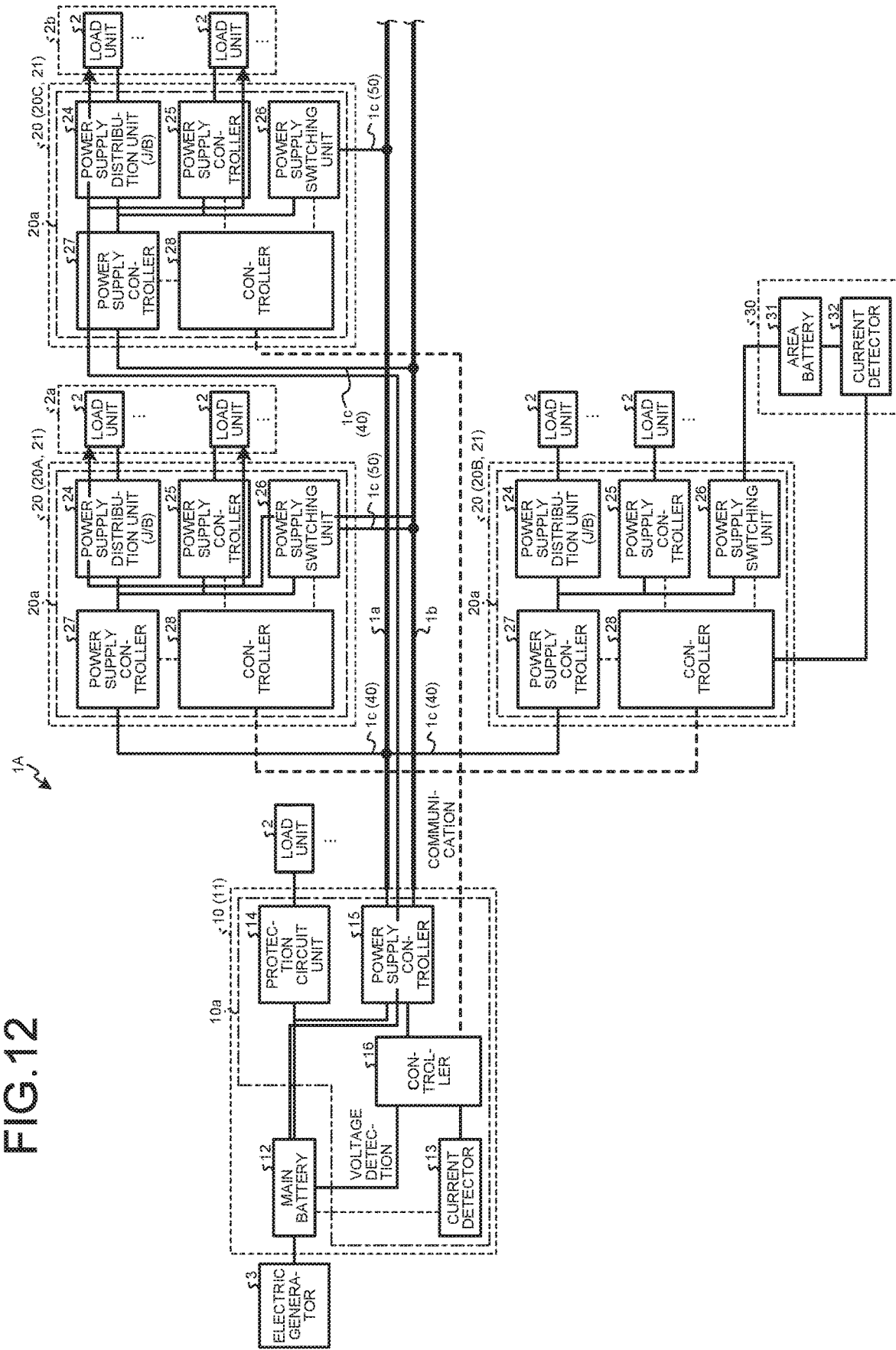
FIG. 12 is a block diagram illustrating a second operation example of the vehicle power supply control device according to the second embodiment.

The area power supply masters 20A and 20C are connected with the first trunk line unit 1a and the second trunk line unit 1b. For example, the area power supply master 20A has a structure in which the power supply controller 27 is connected with the first trunk line unit 1a through the branch line unit 1c (first supply path 40), and the power supply switching unit 26 is connected with the second trunk line unit 1b through the branch line unit 1c (second supply path 50). As illustrated in FIG. 11, the area power supply master 20A is supplied with power from the vehicle power supply master 10 through the first supply path 40. When power cannot be supplied from the vehicle power supply master 10 through the first supply path 40, the area power supply master 20A is supplied with power from the vehicle power supply master 10 through the second supply path 50, as illustrated in FIG. 12.

The area power supply master 20C has a structure in which the power supply controller 27 is connected with the second trunk line unit 1b through the branch line unit 1c (first supply path 40), and the power supply switching unit 26 is connected with the first trunk line unit 1a through the branch line unit 1c (second supply path 50). As illustrated in FIG. 11, the area power supply master 20C is supplied with power from the vehicle power supply master 10 through the first supply path 40. When power cannot be supplied from the vehicle power supply master 10 through the first supply path 40, the area power supply master 20C is supplied with power from the vehicle power supply master 10 through the second supply path 50.

The area power supply master 20B has a structure in which the power supply controller 27 is connected with the first trunk line unit 1a through the branch line unit 1c, and the power supply switching unit 26 is connected with the area battery 31 of the external power supplying unit 30. The area power supply master 20B is supplied with power from the vehicle power supply master 10 through the first trunk line unit 1a and the power supply controller 27. When power cannot be supplied from the vehicle power supply master 10 through the first trunk line unit 1a and the power supply controller 27, the area power supply master 20B is supplied with power from the area battery 31 of the external power supplying unit 30 through the power supply switching unit 26.

First Operation Example of the Second Embodiment: Processing Performed When Power Supply from the Main Battery is Impossible The following is an explanation of a first operation example of the vehicle power supply control device 1A according to the second embodiment. This example also illustrates the case where the vehicle power supply control device 1A is not capable of supplying power of the main battery 12 to the load units 2 of the area power supply master 20A through the first trunk line unit 1a, for example, due to malfunction of the first trunk line unit 1a, as illustrated in FIG. 12.

Figure 13:
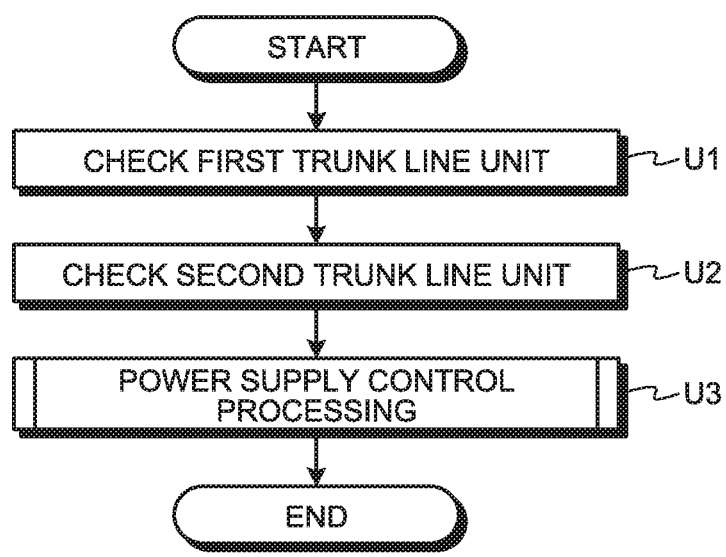
FIG. 13 is a flowchart illustrating the second operation example of the vehicle power supply control device according to the second embodiment.

As illustrated in FIG. 13, each of the area power supply masters 20 checks the state of the first trunk line unit 1a (Step U1). Thereafter, each of the area power supply masters 20 checks the state of the second trunk line unit 1b (Step U2). Thereafter, each of the area power supply masters 20 performs power supply control processing, on the basis of the states of each of the trunk line units 1a and 1b (Step U3). The power supply control processing of each of the area power supply masters 20 will be explained in detail with reference to FIG. 14.

Figure 14:
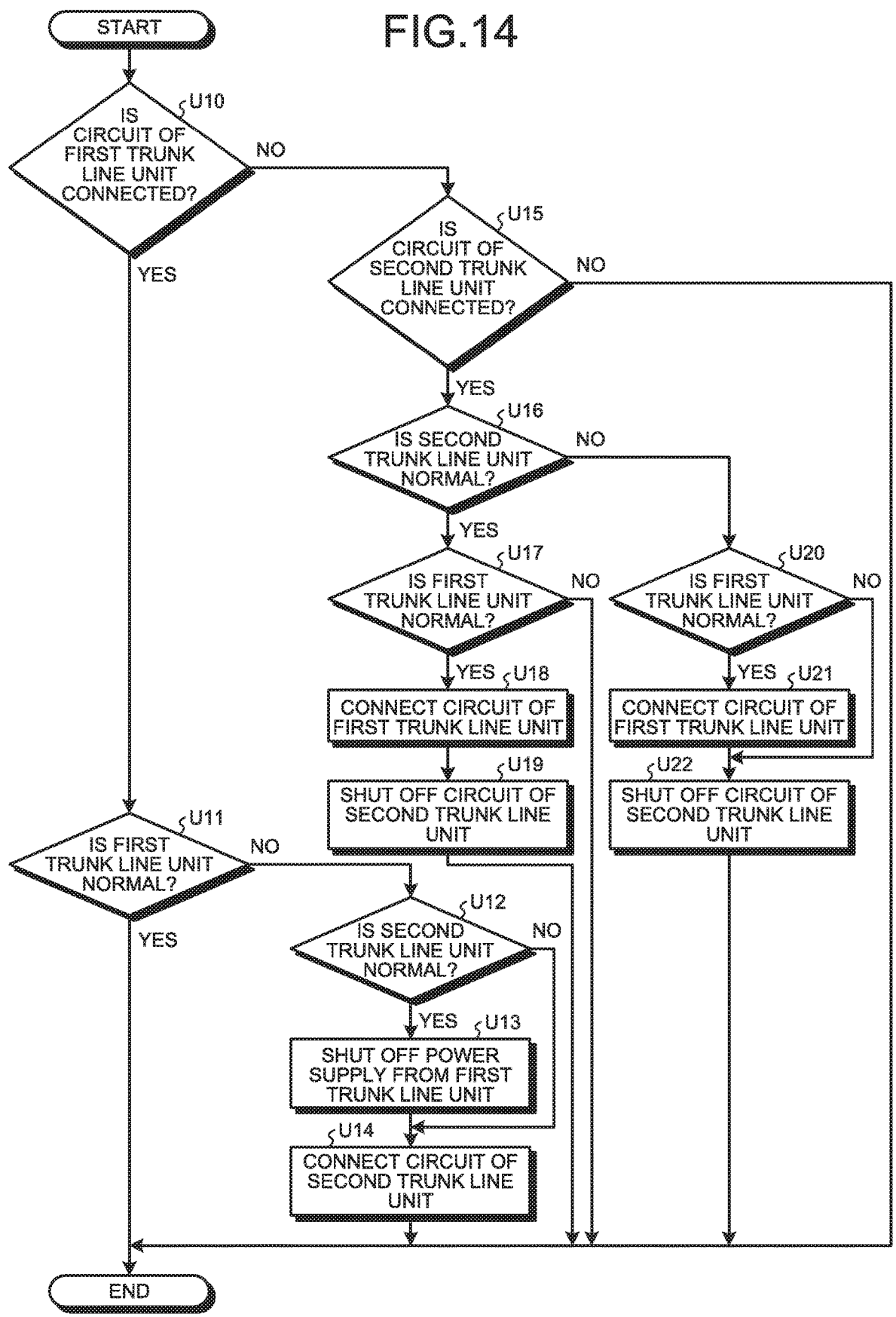
FIG. 14 is a flowchart illustrating the second operation example of the vehicle power supply control device according to the second embodiment.

As illustrated in FIG. 14, the area power supply master 20A determines whether the circuit of the first trunk line unit 1a is connected (Step U10). When the circuit of the first trunk line unit 1a is connected (Yes at Step U10), the area power supply master 20A determines whether the first trunk line unit 1a is normal (Step U11). For example, when power is supplied from the main battery 12 through the first trunk line unit 1a and the power supply controller 27, the area power supply master 20A determines that the first trunk line unit 1a is normal, and ends the processing (Yes at Step U11). In this manner, the area power supply master 20A is supplied with power from the vehicle power supply master 10 through the first supply path 40. When the first trunk line unit 1a is abnormal (No at Step U11), the area power supply master 20A determines whether the second trunk line unit 1b is normal (Step U12). For example, the area power supply master 20A determines that the two-system trunk line unit 1b is normal, when power is supplied from the main battery 12 through the second trunk line unit 1b and the power supply switching unit 26. When the second trunk line unit 1b is normal (Yes at Step U12), the area power supply master 20A shuts off power supply from the first trunk line unit 1a (Step U13). For example, the area power supply master 20A turns off the switch of the shutoff circuit 27a of the power supply controller 27. Thereafter, the area power supply master 20A continuously connects the circuit of the second trunk line unit 1b, and ends the processing (Step U14). For example, the area power supply master 20A turns on the relay contact 26a of the power supply switching unit 26. In this manner, the area power supply master 20A is supplied with power from the vehicle power supply master 10 through the second supply path 50. At Step U12 described above, when the second trunk line unit 1b is abnormal (No at Step U12), the area power supply master 20A ends the processing.

At Step U10 described above, when the circuit of the first trunk line unit 1a is shut off (No at Step U10), the area power supply master 20A determines whether the circuit of the second trunk line unit 1b is connected (Step U15). When the circuit of the second trunk line unit 1b is connected (Yes at Step U15), the area power supply master 20A determines whether the second trunk line unit 1b is normal (Step U16). When the second trunk line unit 1b is normal (Yes at Step U16), the area power supply master 20A determines whether the first trunk line unit 1a is normal (Step U17). When the first trunk line unit 1a is normal (Yes at Step U17), the area power supply master 20A connects the circuit of the first trunk line unit 1a (Step U18). For example, the area power supply master 20A turns on the switch of the shutoff circuit 27a of the power supply controller 27. Thereafter, the area power supply master 20A shuts off the circuit of the second trunk line unit 1b, and ends the processing (Step U19). For example, the area power supply master 20A turns off the relay contact 26a of the power supply switching unit 26. In this manner, the area power supply master 20A is supplied with power from the vehicle power supply master 10 through the first supply path 40. At Step U17 described above, when the first trunk line unit 1a is abnormal (No at Step U17), the area power supply master 20A ends the processing. In this manner, the area power supply master 20A is supplied with power from the vehicle power supply master 10 through the second supply path 50.

At Step U16 described above, when the second trunk line unit 1b is abnormal (No at Step U16), the area power supply master 20A determines whether the first trunk line unit 1a is normal (Step U20). When the first trunk line unit 1a is normal (Yes at Step U20), the area power supply master 20A connects the circuit of the first trunk line unit 1a (Step U21). For example, the area power supply master 20A turns on the switch of the shutoff circuit 27a of the power supply controller 27. Thereafter, the area power supply master 20A shuts off the circuit of the second trunk line unit 1b, and ends the processing (Step U22). For example, the area power supply master 20A turns off the relay contact 26a of the power supply switching unit 26. In this manner, the area power supply master 20A is supplied with power from the vehicle power supply master 10 through the first supply path 40. At Step U20 described above, when the first trunk line unit 1a is abnormal (No at Step U20), the area power supply master 20A shuts off the circuit of the second trunk line unit 1b, and ends the processing (Step U22). At Step U15 described above, when the circuit of the second trunk line unit 1b is not connected (No at Step U15), the area power supply master 20A ends the processing.

As described above, the vehicle power supply control device 1A according to the second embodiment has a structure in which the vehicle power supply master 10 also serves as the external power supplying unit 30, the first supply path 40 is a path supplying power from the vehicle power supply master 10 to the area power supply master 20A through the first trunk line unit 1a, and the second supply path 50 is a path supplying power from the vehicle power supply master 10 to the area power supply master 20A through the second trunk line unit 1b. This structure enables the vehicle power supply control device 1A to supply power from the vehicle power supply master 10 to the load units 2 of the area power supply master 20A through the first supply path 40, when power is supplied from the vehicle power supply master 10 through the first trunk line unit 1a. In addition, when no power is supplied from the vehicle power supply master 10 through the first trunk line unit 1a, the vehicle power supply control device 1A enables supply of the power from the vehicle power supply master 10 to the load units 2 of the area power supply master 20A through the second supply path 50. Accordingly, the vehicle power supply control device 1A is enabled to stably supply power to the load units 2 of the vehicle. The second embodiment illustrates the example in which power is supplied to the area power supply master 20A, but similar control is performed also on the area power supply master 20C.

Third Embodiment

Figure 15:
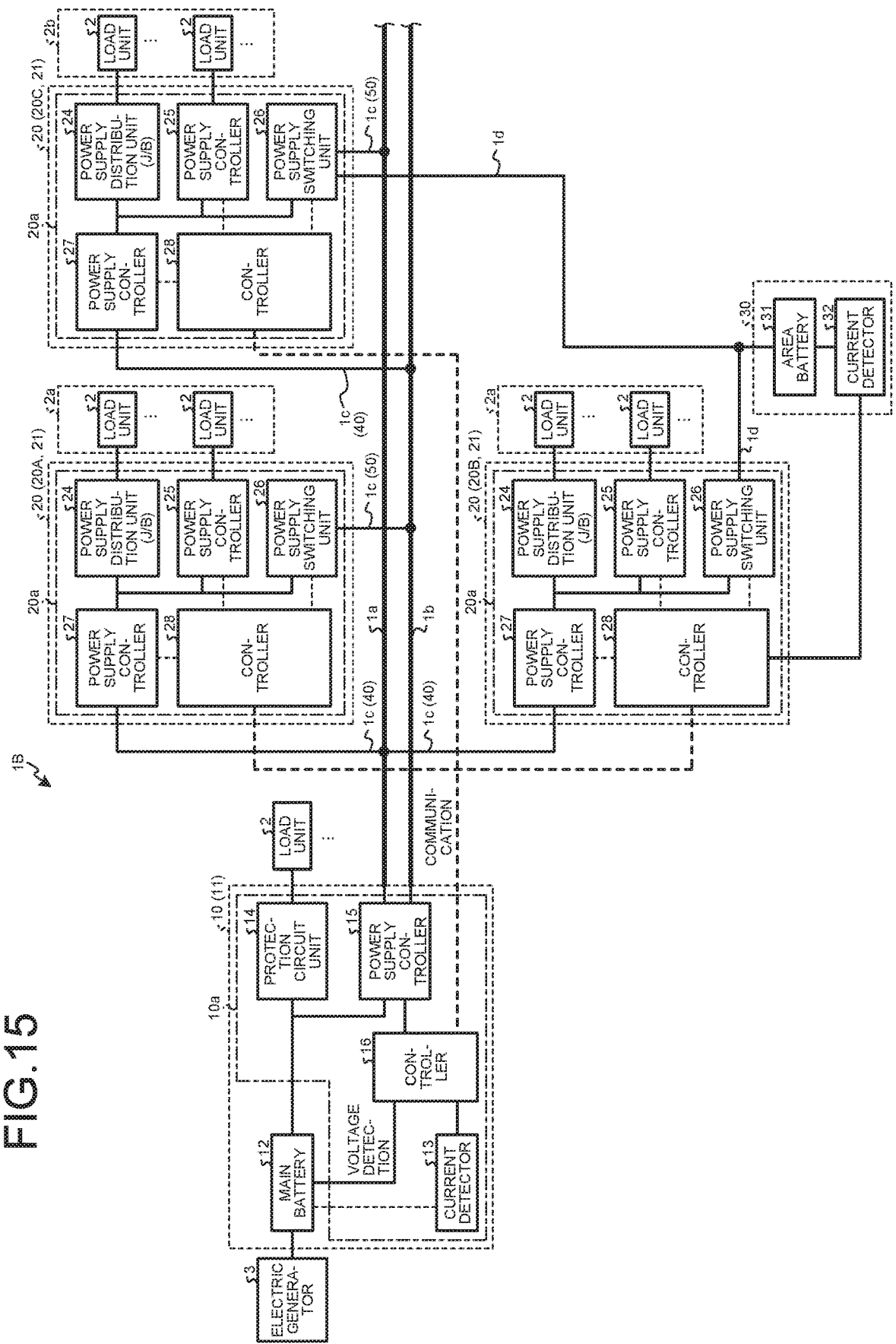
FIG. 15 is a block diagram illustrating a configuration example of the vehicle power supply control device according to a third embodiment.

The following is an explanation of a vehicle power supply control device 1B according to the third embodiment. The vehicle power supply control device 1B is different from the vehicle power supply control device 1 according to the first embodiment, in that the vehicle power supply control device 1B includes the external power supplying unit 30 illustrated in FIG. 15. In the vehicle power supply control device 1B according to the third embodiment, constituent elements equivalent to those of the vehicle power supply control device 1 according to the first embodiment are denoted with the same reference numerals, and a detailed explanation thereof is omitted.

The external power supplying unit 30 supplies power to each of the area power supply masters 20. The external power supplying unit 30 is provided outside the area power supply masters 20, and connected with the power supply switching unit 26 of each of the area power supply masters 20 through the connection line 1d. The external power supplying unit 30 includes the area battery 31 and the current detector 32. The area battery 31 is an external electric storage device, and charged with and discharges power. The area battery 31 is a battery different from the main battery 12, and connected with each of the area power supply masters 20B and 20C. The area battery 31 includes various storage batteries, such as a lead battery, a nickel hydrogen battery, and a lithium ion battery. The external power supplying unit 30 supplies power to each of the area power supply masters 20B and 20C from the area battery 31 through the connection line 1d. The current detector 32 is connected with the area battery 31, to detect the current of the area battery 31. The current detector 32 includes, for example, the shunt resistor 32a, to detect the charge/discharge current of the area battery 31. Specifically, the current detector 32 detects the current from the voltage proportional to the current generated with the resistance of the shunt resistor 32a. The current detector 32 is connected with the area power supply master 20B, and outputs a detection result to the area power supply master 20B. The area power supply master 20B charges and discharges the area battery 31, on the basis of the detection result output from the current detector 32. For example, the area power supply master 20B performs control to discharge the area battery 31, when the charge rate of the area battery 31 is equal to or larger than the preset value, and charge the area battery 31 when the charge rate of the area battery 31 is less than the preset value.

The external power supplying unit 30 supplies the power of the battery to each of the area power supply masters 20B and 20C, as a result of turning on the relay contact 26a of the power supply switching unit 26 with each of the area power supply masters 20B and 20C. In this manner, each of the area power supply masters 20B and 20C is enabled to supply power to the load units 2 more stably. In addition, the external power supplying unit 30 stops the power supplied to each of the area power supply masters 20B and 20C, as a result of turning off the relay contact 26a of the power supply switching unit 26 with each of the area power supply masters 20B and 20C. The external power supplying unit 30 may include an electric generator, instead of the battery. In this case, the external power supplying unit 30 supplies the power generated with the electric generator to each of the area power supply masters 20B and 20C, as a result of turning on the relay contact 26a of the power supply switching unit 26 with each of the area power supply masters 20B and 20C. In this manner, the vehicle power supply control device 1B, which includes the external power supplying unit 30, is enabled to supply power to the load units 2 more stably.

Modification

The following is an explanation of a modification of the embodiments. The vehicle power supply master 10 may charge the main battery 12 with the power supplied from the external power supplying unit 30. For example, when the charge rate of the main battery 12 decreases, the vehicle power supply master 10 checks the state (for example, the charge rate) of the area battery 31 of the external power supplying unit 30. When power can be supplied from the area battery 31 of the external power supplying unit 30, the vehicle power supply master 10 charges the main battery 12 with the power supplied from the area battery 31 of the external power supplying unit 30.

Each of the area power supply masters 20 may include an area battery different from the area battery 31 of the external power supplying unit 30.

The vehicle power supply control device according to the present embodiments has a structure in which the area power supply controller supplies power supplied from the master power supply controller through the first supply path, or power supplied from the external power supplying unit through the second supply path, to the load units, and is capable of stably supplying power to the load units of the vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply control device, comprising:
a trunk line unit provided on a vehicle;
a branch line unit branched from the trunk line unit;

a master power supply controller connected with the trunk line unit, and including a main electric storage device charged with power and discharging power;

an area power supply controller connected with the trunk line unit through the branch line unit, and connected with load units consuming power;

an external power supplying unit provided outside the area power supply controller, and capable of supplying power to the area power supply controller;

a first supply path that supplies power to the area power supply controller from the master power supply controller through the trunk line unit and the branch line unit; and a second supply path that is different from the first supply path, and supplies power from the external power supplying unit to the area power supply controller, wherein the area power supply controller supplies power supplied from the master power supply controller through the first supply path, or power supplied from the external power supplying unit through the second supply path, to the load units.

2. The vehicle power supply control device according to claim 1, wherein the external power supplying unit includes an external electric storage device different from the main electric storage device and charged with and discharging power, and supplies power to the area power supply controller from the external electric storage device through the second supply path.

3. The vehicle power supply control device according to claim 2, wherein the area power supply controller supplies power of the external electric storage device to the load units through the second supply path, when the master power supply controller is not capable of supplying power to the area power supply controller through the first supply path.

4. The vehicle power supply control device according to claim 2, wherein the area power supply controller supplies power of the external electric storage device to the load units through the second supply path when a charge rate of the external electric storage device is equal to or larger than a preset value, and supplies no power of the external electric storage device to the load units through the second supply path when the charge rate of the external electric storage device is less than the preset value.

5. The vehicle power supply control device according to claim 3, wherein the area power supply controller supplies power of the external electric storage device to the load units through the second supply path when a charge rate of the external electric storage device is equal to or larger than a preset value, and supplies no power of the external electric storage device to the load units through the second supply path when the charge rate of the external electric storage device is less than the preset value.

6. The vehicle power supply control device according to claim 2, wherein the area power supply controller supplies power of the external electric storage device with priority to the load units through the second supply path, when the master power supply controller is capable of supplying power to the area power supply controller through the first supply path and a charge rate of the external electric storage device is equal to or larger than a preset value.

7. The vehicle power supply control device according to claim 3, wherein the area power supply controller supplies power of the external electric storage device with priority to the load units through the second supply path, when the master power supply controller is capable of supplying power to the area power supply controller through the first supply path and a charge rate of the external electric storage device is equal to or larger than a preset value.

8. The vehicle power supply control device according to claim 4, wherein the area power supply controller supplies power of the external electric storage device with priority to the bad units through the second supply path, when the master power supply controller is capable of supplying power to the area power supply controller through the first supply path and the charge rate of the external electric storage device is equal to or larger than a preset value.

9. The vehicle power supply control device according to claim 5, wherein the area power supply controller supplies power of the external electric storage device with priority to the load units through the second supply path, when the master power supply controller is capable of supplying power to the area power supply controller through the first supply path and the charge rate of the external electric storage device is equal to or larger than a preset value.

10. The vehicle power supply control device according to claim 1, wherein the main electric storage device also serves as the external power supplying unit, the trunk line unit includes a plurality of systems of trunk line units, the first supply path is a path supplying power to the area power supply controller from the master power supply controller through one of the trunk line units and the branch line unit, and the second supply path is a path supplying power to the area power supply controller from the external power supplying unit through a connection one.

* * * * *